United States Patent [19]

Charles et al.

[11] Patent Number: 4,599,164
[45] Date of Patent: Jul. 8, 1986

[54] PROCESS FOR PRE-CONCENTRATION TREATMENT OF FOOD BY-PRODUCTS AND INSTALLATION FOR CARRYING OUT SAME

[75] Inventors: Jean-Michel Charles, Bihorel; Jean-Paul Roulland, Rouen, both of France

[73] Assignee: L'Air Liquide, Societe Anonyme pour l'Etude et l'Exploitation des Procedes Georges Claude, Paris, France

[21] Appl. No.: 525,617

[22] Filed: Aug. 22, 1983

[51] Int. Cl.$^4$ .................................... B01D 13/00
[52] U.S. Cl. ............................ 210/86; 210/433.2; 210/639; 210/651
[58] Field of Search .............. 426/490, 491; 210/639, 210/259, 651, 86, 433.2

[56] References Cited

U.S. PATENT DOCUMENTS

| | | | |
|---|---|---|---|
| 3,799,806 | 3/1974 | Madsen | 210/639 X |
| 3,850,747 | 11/1974 | Lyall | 210/639 X |
| 4,140,806 | 2/1979 | Glimehus et al. | 210/651 X |
| 4,176,057 | 11/1979 | Wheatley et al. | 210/639 X |
| 4,222,871 | 9/1980 | Lefeuvre | 210/259 X |

FOREIGN PATENT DOCUMENTS 617507  2/1927  France ............................... 210/651

OTHER PUBLICATIONS

Patents Abstracts of Japan, vol. 2, No. 152, Dec. 20, 1978, p. 3679C78.
Australian Journal of Dairy Technology, vol. 33, No. 2, 6-1978, pp. 57-62.
Journal of Dairy Science, vol. 63, No. 2, 2-1980, pp. 204-214.

Primary Examiner—Frank Spear
Attorney, Agent, or Firm—Browdy and Neimark

[57] ABSTRACT

The process valorizes food by-products by a reverse osmosis. The pH is temporarily lowered by the injection of carbon dioxide in the medium containing the food by-product before its pre-concentration by reverse osmosis, preferably in the medium to be treated under low or moderate pressure, at a point at which the velocity of circulation of the liquid medium increases. System for introducing carbon dioxide between the low-moderate pressure pump 4 and the high pressure pump 8 at the entrance of the conical device 7. Application in the pre-concentration by reverse osmosis of food by-products, and in particular the lactoserum.

2 Claims, 1 Drawing Figure

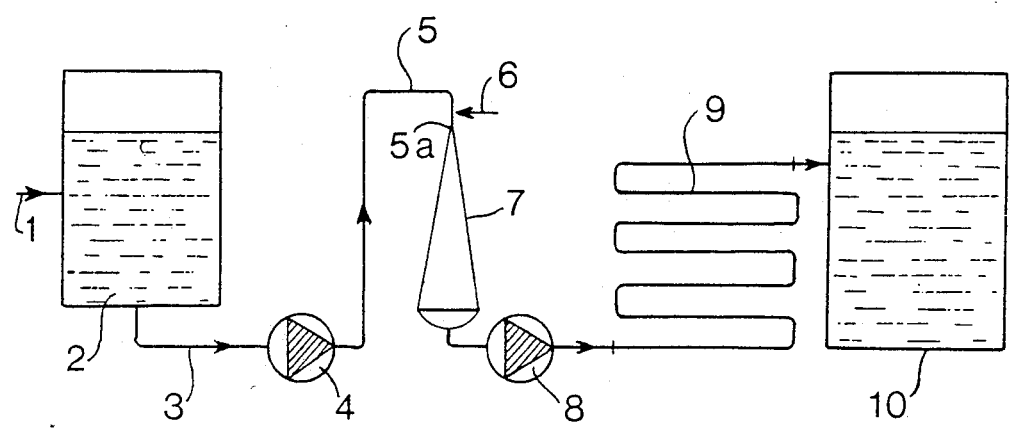

4,599,164

PROCESS FOR PRE-CONCENTRATION TREATMENT OF FOOD BY-PRODUCTS AND INSTALLATION FOR CARRYING OUT SAME

FIELD OF INVENTION

The present invention relates to a process for treating food by-products.

BACKGROUND

Economy of energy and the valorization of by-products in the food industries are a constant preoccupation. The valorization of these by-products requires pre-concentration treatments; one thereof, reverse osmosis, has been at present developed.

In this process, the liquid to be treated is passed through membranes under pressure. However, some constituents of food by-products have a tendency to precipitate and finally clog up the membranes, which necessitates frequent stoppages of the installation and the replacement of the membranes. Thus, in the milk industry, some constituents of the lactoserum, such as the phosphocalcic compounds, exhibit this tendency to crystallize in the course of the treatment in the reverse osmosis installation. A conventional reverse osmosis installation comprises a system supplying the product to be treated, an optional buffer tank, followed by a force pump termed a low-pressure pump and delivering pressures of between 1 and 10 bar, then a force pump termed a high-pressure pump and whereby it is possible to reach pressures of as much as 100 bar, usually of the order of 50 bar, in the region of the entrance to the reverse osmosis filters, and lastly a tank for storing the concentrate.

SUMMARY

It has now been attempted to avoid this precipitation by a reversible lowering of the pH of the concentrated solution. In order to obtain this temporary lowering of the pH, there is proposed the injection of carbon dioxide into the solution containing the food by-products, prior to subjecting same to a pre-concentration treatment by reverse osmosis.

The injection of carbon dioxide in a food by product treated by the technique of reverse osmosis, with reversible lowering of the pH, enables a crystallization of the chemical compounds to be avoided and results in a much longer period of utilization of the membranes. Carbon dioxide is a particularly useful acid agent, since it gives the opportunity of easy control and adjustment in accordance with the needs as a result of its mild acidification.

It is advantageous to regulate the quantity of carbon dioxide introduced in accordance with the need for acid for preventing any crystallization in the liquid medium and clogging of the reverse osmosis membranes. Means indicating the need for acid, and consequently carbon dioxide, may be used which are adapted to the treated food by-products, for example, in relation to the variation of resistivity of the medium to be treated. The form of these means and the nature of their outer covering are such that the measurement of the indication is not disturbed by the possible presence of foam or the formation of a liquid film on the surface of these means.

The dissolving of the carbon dioxide constitutes a unit transfer of matter operation, the fluids present being respectively liquid—solution containing the by-product—and gaseous—the carbon dioxide. Consequently, the effectiveness of the transfer is related to the quality of the gas-liquid emulsion. Also, it has been found to be of interest to increase the velocity of the liquid at the point of injection of the carbon dioxide so as to produce an emulsion or a fractionation of the bubbles.

The carbon dioxide may be injected at various points of the reverse osmosis installation. The injection of the carbon dioxide may be envisaged during the supply of the product to be treated, before the medium to be treated has entered the buffer tank; it is also possible to effect this injection in a part of the liquid medium subjected to a buffer agent, i.e. in a branch connection on the buffer tank. It may be of interest to inject the carbon dioxide upstream of the point where the medium to be treated is brought to low pressure. However, the injection of carbon dioxide at a point located in the low-moderate pressure circuit downstream of the first rise in pressure, of the medium to be treated by reverse osmosis, and upstream of the second (i.e. high pressure) rise in pressure of the medium to be preconcentrated by reverse osmosis, constitutes a particularly effective and advantageous location where this injection is effected in a zone in which the velocity of circulation of the liquid medium increases.

The process of the invention gives excellent results in the milk industry in the valorization of lactoserum.

BRIEF DESCRIPTION OF DRAWING

The sole FIGURE is a schematic illustration of a means suitable for carrying out the present invention.

The apparatus of the present invention as shown the drawing FIGURE includes a pipe 1 for introducing the product to be treated into a buffer tank 2, an outlet pipe 3 at the base of the buffer tank, an outlet pipe 5 for a low or moderate pressure pump, and a supply pipe 6 for introduction of carbon dioxide. Pipe 5 has an abrupt narrowing 5a at the top of a conical device 7. A high pressure pump 8 circulates liquid to be treated through reverse osmosis membranes 9 to a storage tank 10.

DETAILED DESCRIPTION OF EMBODIMENTS

There is given hereinafter an example of embodiment of the installation and its operation in the course of the pre-concentration of lactoserum by reverse osmosis, with injection of carbon dioxide between the low pressure force pump and the high pressure force pump.

The installation shown in the FIGURE of the accompanying drawing comprises a pipe 1 for introducing the product to be treated into a buffer tank 2, an outlet pipe 3 for the liquid medium at the base of the buffer tank, conveying the liquid medium to the low pressure force pump 4, the low pressure being between 1 and 10 bar in an outlet pipe 5 of said low or moderate pressure pump in which the injecting system for the gas: carbon dioxide is of an easily-cleaned simple design capable of operating up to a relative pressure of 10 bar.

Immediately following on the introduction of carbon dioxide from a supply pipe 6, the pipe 5 has an abrupt narrowing 5a at the top of a conical device 7.

The production of the emulsion, or the fractionation of the bubbles, is achieved by the abrupt narrowing at the entrance of the cone, so as to increase the velocity of the liquid at the point of injection of the carbon dioxide. Further, the gas-liquid contact is considerably improved by the position of a cone immediately after the emulsion-forming system. This arrangement of the cone constitutes a characteristic of the carbon dioxide injection installation. The conical shape has for effect to create a velocity gradient of the liquid medium, which results in a segregation of the gas bubbles; the bubbles of largest diameter being located in the upper part of the cone and the bubbles of smallest diameter being drawn towards the base thereof.

The second characteristic of the carbon dioxide injecting system resides in the fact that the injection of carbon dioxide is regulated by means indicating the need for acid (not shown) placed alongside a generatrix of the cone. These indicating means may be level sensors whose operation is based on the principle of a measurement of the resistivity. These level sensors are adapted to the treated products, in particular lactoserum. The form of the electrodes constituting the sensors, and their outer covering are such that the presence of foam or the formation of a liquid film on their surface cannot in any way disturb the measurement of the indication.

At the outlet of a cone 7, the high pressure pump 8 circulates the liquid to be treated in the successive stages of reverse osmosis membranes 9, and the concentrate is then stored in a storage tank 10.

The installation is operated with mild lactoserum as the treated product. The mild lactoserum arrives in the tank 2 through the pipe 1, the (low or moderate pressure) pump 4 takes the liquid from the buffer tank and delivers it to the cone provided with the emulsion producing system.

The main parameters measured are:
flow of mild lactoserum: 10 cm.m./hour
flow of $CO_2$ gas: 1 kg/hour
concentration of dissolved $CO_2$ gas at the outlet of the cone: 1 gl/hour
pH of the liquid before the cone: 6.4
pH of the liquid after the cone: 5.7

The time during which the emulsion stays in the cone, namely between 5 seconds and 5 minutes, facilitates the lowering of the pH by 1 to 1.5 units.

At the outlet of the cone, the high pressure pump (delivery pressure: 50 bar) circulates the liquid to be treated in three successive stages of reverse osmosis membranes.

Before the installation of the carbon dioxide dissolving device, the reverse osmosis membranes became clogged up within one to two hours of operation.

With the use of carbon dioxide and the insertion of the $CO_2$ injecting system described in the example, the reverse osmosis membranes are effectively used for nine hours and more.

This process and its system for injecting carbon dioxide in a by-product of the food industry may be installed in any reverse osmosis unit in which a reversible a lowering of the pH avoids a crystallization of the chemical compounds and results in a much longer period of utilization of the membranes.

What is claimed is:

1. An installation for carrying out a preconcentration treatment of liquid food by-product by reverse osmosis, comprising a system for supplying the liquid food by-product to be treated, a buffer tank for holding the liquid by-product from said supplying system, a low-moderate pressure force pump downstream from the buffer tank, a high pressure force pump downstream from the low-moderate pressure force pump, a first pipe between the low-moderate pressure pump and the high pressure pump, reverse osmosis filters downstream from the low-moderate pressure force pump, and a storage tank for filtered medium downstream from said reverse osmosis filters, said installation further comprising means for feeding gaseous carbon dioxide to the liquid food by-product to temporarily lower the pH thereof, including a conical device located between said first pipe and said high pressure pump, and gas injecting means for forming a gas-liquid emulsion at the top of the conical device, said gas injecting means including a second pipe connected to the first pipe for supplying carbon dioxide gas to the first pipe means connected to said first pipe near the small end of a conical device for feeding gaseous carbon dioxide to the liquid food by-product to temporarily lower the pH thereof, said first pipe having an abrupt narrowing near said small end, said conical device being located between said first pipe and said high pressure pump, said gas feeding means including a second pipe connected to the first pipe for supplying carbon dioxide gas to said first pipe upstream of said abrupt narrowing.

2. An installation according to claim 1, further comprising indicating means constituted by level sensors placed alongside a generatrix of the conical device.

* * * * *